United States Patent

[11] 3,625,613

| [72] | Inventors | Gurdon R. Abell |
| | | West Woodstock, Conn.; |
| | | Charles E. Gillespie, Acton, Mass. |
| [21] | Appl. No. | 741,023 |
| [22] | Filed | June 28, 1968 |
| [45] | Patented | Dec. 7, 1971 |
| [73] | Assignee | Avco Corporation |
| | | Cincinnati, Ohio |

[54] APPARATUS FOR REMOTE SENSING AND ANALYZING OF GASEOUS MATERIALS USING RAMAN RADIATION
4 Claims, 3 Drawing Figs.

| [52] | U.S. Cl. | 356/75 |
| [51] | Int. Cl. | G01j 3/44 |
| [50] | Field of Search | 356/75, 103, 104; 250/43.5, 83.3, 226 |

[56] References Cited
UNITED STATES PATENTS

| 3,371,574 | 3/1968 | Dwyer | 356/75 |
| 3,442,591 | 5/1969 | Ogura | 356/75 |
| 3,446,555 | 5/1969 | Kakn | 356/5 |

OTHER REFERENCES

" Scattering of Ruby- Laser Beam by Gases"; George et al., Physical Review Letters; Vol. 11 09; 1 Nov. 1963 pg. 403–406

Primary Examiner—Ronald L. Wibert
Assistant Examiner—V. P. McGraw
Attorneys—Charles M. Hogan and Melvin E. Frederick ABSTRACT: A turbomachine apparatus disclosed includes a laser transmitter for transmitting a pulsed laser beam for remote sensing and analyzing of gaseous materials. A receiver including optical means gathers scattered light which is supplied to light beam separating means which provide light beams at the wave-number of the incident unshifted laser beam light and at the Raman-shifted wave numbers of the light scattered by the remote gaseous materials being sensed and analyzed.

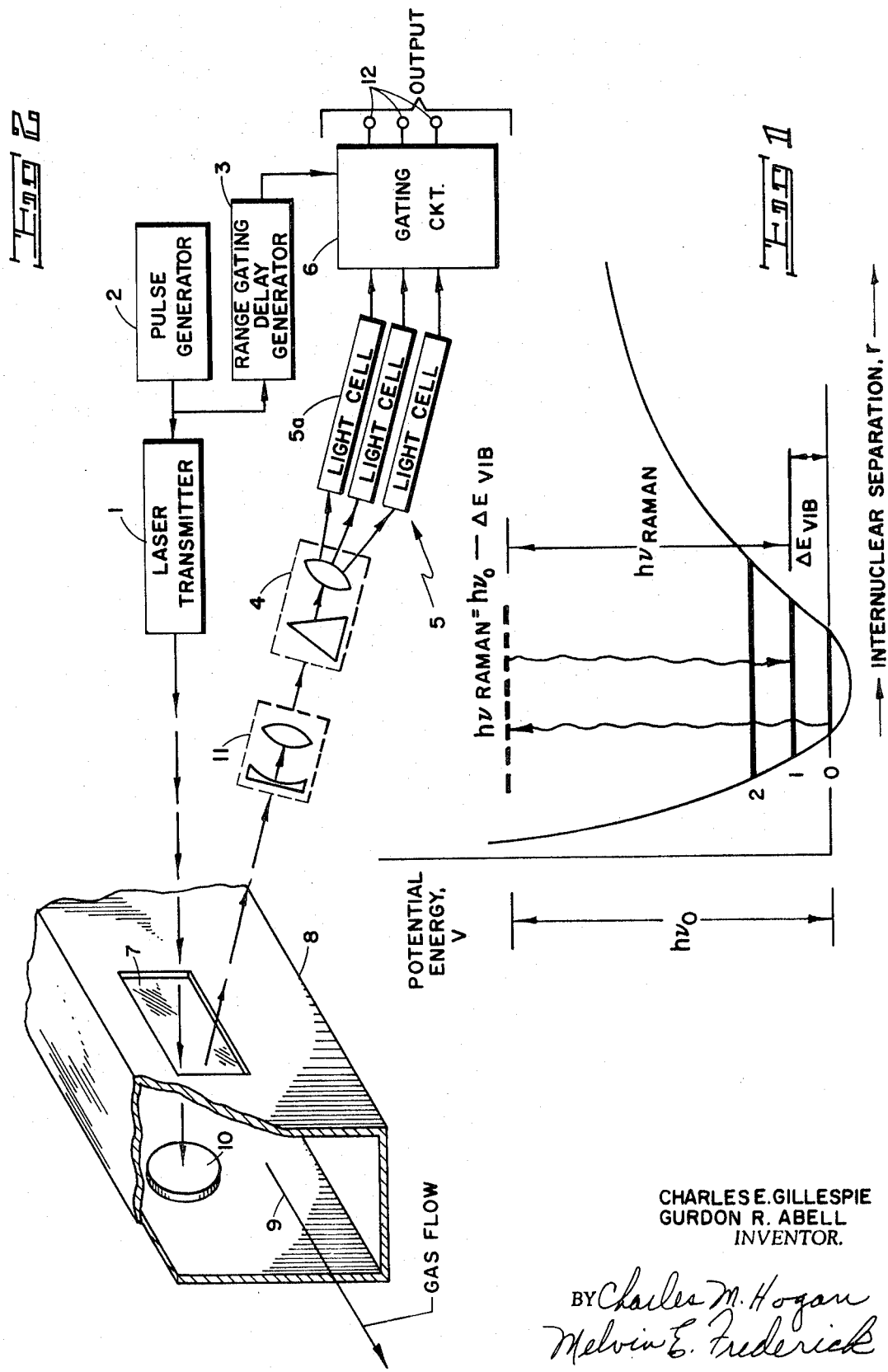

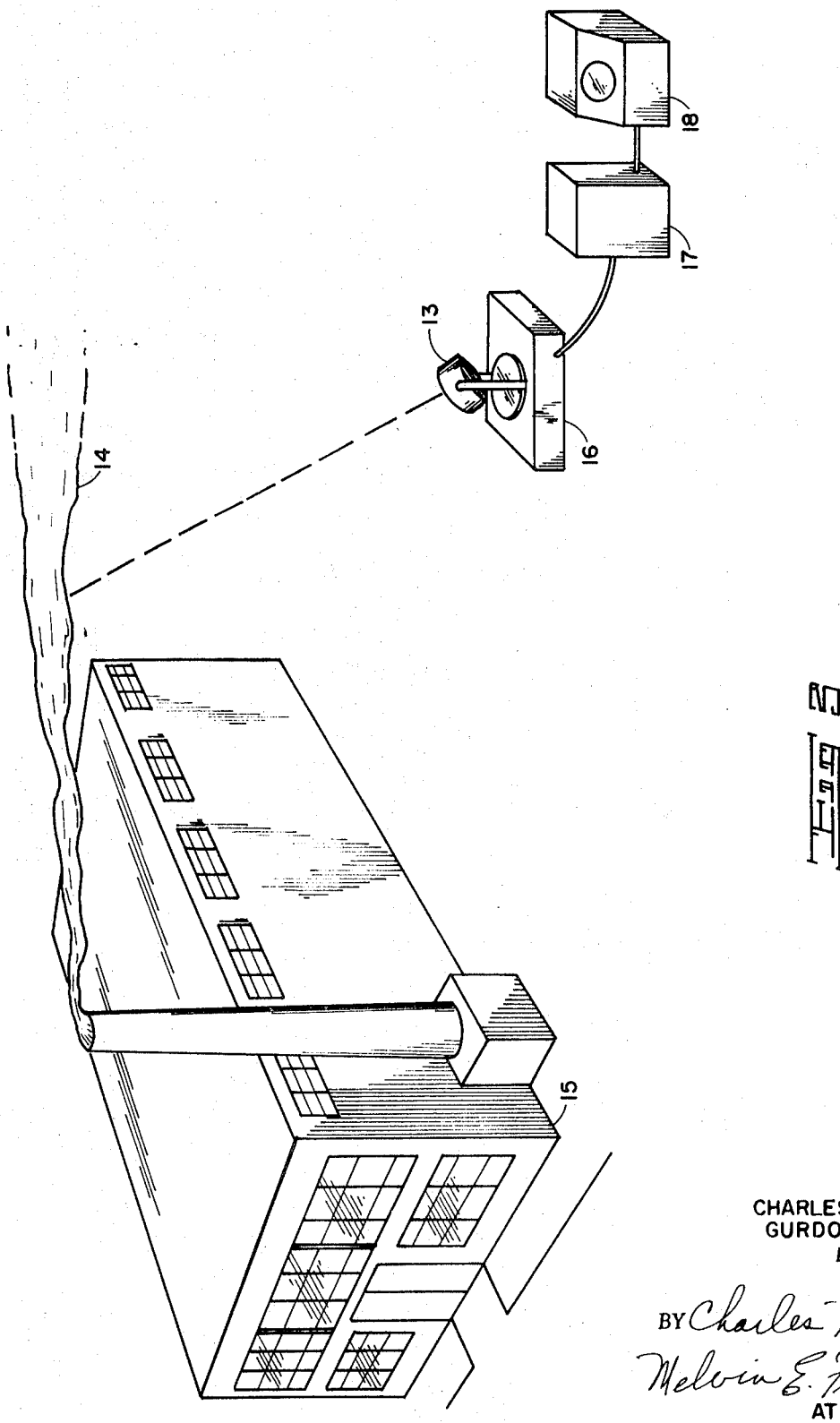

APPARATUS FOR REMOTE SENSING AND ANALYZING OF GASEOUS MATERIALS USING RAMAN RADIATION

The invention is directed to the sensing and analyzing of gaseous materials and is particularly concerned with the sensing and analyzing of gaseous materials which are remote or otherwise inaccessible such as, for example, the sensing, analysis, location and identification of gaseous materials, constituents, contaminants and pollutants, of gaseous effluents from furnaces, engines, and of gaseous byproducts of explosives, propellants, antipersonnel gases and the like.

There has been a long felt need for a system for monitoring of atmospheric pollutants, the analysis of gaseous components in dangerous radioactive or otherwise inaccessible gas flows, and the sensing and location of military targets emitting characteristic gases.

Effective air pollution control, for example, requires a satisfactory means for monitoring pollutants at their sources and in urban atmospheres. A large variety of probe-type analytical instruments is commercially available and is widely used for point-source measurement. However, remote optical monitoring which provides many distinct advantages over point-source measurement can be performed by observing, in accordance with the invention, the spectral distribution of laser light backscattered from pollutants, i.e., by observing the Raman scattering. Such a system can be used to detect, measure and locate many molecular and particulate pollutants and gaseous components in a variety of circumstances from remote locations.

Consider the following pertinent characteristics and utility of a monitoring system in accordance with the invention.

1. The system can be placed at a distance from the location being measured, thus eliminating the need to sample physically at the point of measurement, which may be difficult, impractical or not physically or legally possible.

2. The system comprising a laser light source and detector adjacent each other is located at one location. When compared with double-ended systems, this arrangement has great advantages in situations where a relatively rapid continuous scan or a tracking capability is desired.

3. With a pulsed laser as the light source, conventional ranging techniques can be employed to determine the precise locations of pollutants or gaseous components to within the accuracy of the laser pulse duration. Thus for a pulsed nitrogen laser, for example, having a pulsed duration of 10 nanoseconds, this is equivalent to a length of 10 feet. Alternatively, the total detected backscattered signal along the entire optical path may be used to give an "integrated long-path measurement" such as is obtained with conventional double-ended absorption devices.

4. Since the system is an active system in the sense that a pulsed laser is used as a controlled radiation source, the system does not depend on the sample to provide the radiation being measured. The system is therefore not dependent on the restricted circumstances usually required for the operation of passive systems, i.e., an infrared $SO_2$ detection system requires a warm gas, and an ultraviolet $SO_2$ detection system requires scattered solar ultraviolet.

While the simplicity of prior art passive systems will ensure their use wherever they can be employed, an active system with range resolution in accordance with the invention permits a much broader and more complete coverage. For example, the system is able to determine the three-dimensional $SO_2$ concentration profiles in a stack plume at night at distances sufficiently far from the stack that the temperature is very close to ambient.

5. The system permits a remote quantitative spectroscopic examination of a gas sample and is not limited to detecting a single species but can be used to detect and monitor many of the important molecular pollutants and gaseous components and is therefore a generally useful device for a great many gaseous and air pollution control situations.

6. By detecting backscatter from atmospheric nitrogen, the system can function as a transmissometer. Stack plume transmission has been shown to be related to the concentration of particulate matter in the plume, which is also of interest for air pollution control.

In 1923, A. Smekal published a theoretical paper on the quantum theory of dispersion in which he showed that for light scattering in transparent media frequencies other than those present in the original light might be found in the scattered radiation. The effect predicted by Smekal was experimentally verified in liquids by Raman in 1928, and the phenomenon is now known as the Raman effects. The experimental study of the effect was subsequently extended to gases by R. W. Wood who obtained the first Raman spectrum of HCl, and by F. Rasetti who first reported the observation of the Raman spectra of CO and $CO_2$.

For several decades, Raman spectroscopy proved to be an invaluable tool for the physicists for studying the structure of molecules. However, this early work was limited by the need for very long exposure times with extremely high power mercury arc lamps. The advent of the laser, a high intensity source of monochromatic light, has caused a renewed interest in Raman spectroscopy. Instruments are now being marketed which combine CW lasers and scanning tandem monochromators into systems of great practical utility.

The frequencies observed in Raman scattering correspond to the frequency of the incident light shifted by some characteristic frequency of the scattering molecule. A potential energy diagram for a typical molecule undergoing vibrational Raman scattering is shown in FIG. 1. Photons of $\nu_o$ and energy $h\nu_o$ are incident on the molecule. Photons of frequency $\nu_{RAMAN}$ and energy $h\nu_{RAMAN}$ are scattered and the molecule is left in a higher vibrational energy state after the collision than before. The difference in energy between the incident and scattered photons is exactly equal to the energy given to the molecule, and in the case of vibrational excitation is the vibrational energy spacing $\Delta E_{VIB}$. Thus, by measuring the energy of the Raman scattered photons and by knowing the energy of the incident photons the vibrational energy spacing of the scattering molecule may be determined.

By way of example, molecular species generally deemed to be of interest are listed in table I below. They are arranged in order of increasing Raman wavenumber shifts. It will be noted that a given species may provide Raman scattering at a plurality of Raman-shifts, corresponding to a plurality of vibrational energy levels as shown in FIG. 1.

TABLE I

| Species | Raman-Shift (CM$^{-1}$) |
|---|---|
| $Cl_2$ | 556.0 |
| $F_2$ | 892.0 |
| $NH_3$ | 934.0 |
| $NH_3$ | 964.3 |
| $SO_2$ | 1152.2 |
| $CO_2$ | 1285.5 |
| $N_2O$ | 1286.5 |
| $CO_2$ | 1388.3 |
| $O_2$ | 1554.7 |
| NO | 1877.0 |
| HCN | 2089.0 |
| CO | 2145.0 |
| $N_2O$ | 2223.2 |
| $N_2$ | 2330.7 |
| $H_2S$ | 2610.8 |
| $NH_3$ | 3334.2 |
| $H_2O$ | 3651.7 |

The 3371 A. pulsed nitrogen laser is preferred for the following reasons:

1. Raman scattering cross sections vary inversely with the fourth power of incident wavelength. Thus, a pulsed nitrogen laser is more effective than a ruby laser by a factor of $(6940/3371)^{C/}=17$.

2. The photoefficiency of photocathodes is much higher in the ultraviolet than in the near infrared. With a 6940 A. ruby source the $N_2$ Raman line is shifted to 8280 A. where the best photoefficiency (S–1) is about 0.4 percent compared with 10 percent for the S–20 surface of 3658 A. This effect gives a factor of 25 in favor of a pulsed nitrogen laser.

The product of the above two factors is 17.96×25=449. When the difference in energy per photon is taken into account, 100 kilowatt pulsed nitrogen laser is as effective in producing Raman scattered photoelectrons as would be a ruby laser of 21.8 megawatts with the same pulse width. A nitrogen laser has the further advantage not available to the ruby laser of a high repetition rate capability (100 pulses per second) which permits rapid scanning or signal averaging.

The number of photon collected by the detection system in the present invention can be expressed by the equation $$N_{PE} = N_{LASER} \, N_{scat} \, \sigma_{RAMAN} \, \Delta R \, \Omega \, \epsilon_p \, \epsilon_o \, e^{-2\gamma R}$$

where $N_{PE}$ == Number of photoelectrons detected
$N_{LASER}$ = Number of photons in outgoing laser pulse
$N_{scatt}$ = Density of scattering molecules, particles /cm.$^3$
$\sigma_{RAMAN}$ = Differential Raman scattering cross-section, cm.$^2$/ steradian
$\Delta R$ = Length of scattering region observed, CM
$\Omega$ = Solid angle of collection optics = $\pi/4$ (D$^2$/R$^2$)
$\epsilon_p$ = Photoelectric efficiency
$\epsilon_o$ = Efficiency of optical system
$\gamma$ = Extinction coefficient
R = Range to scattering region It will be seen from the above equation that if $\Delta R$, $\sigma_{RAMAN}$, the detection solid angle and the detection efficiencies are known, the only two quantities remaining are the density of scattering molecules, $N_{SCAT}$, and the transmission factor, $e^{-2\gamma R}$, to the range of interest. Thus, it will now been seen that a measure of the Raman scattering light from a region can be used to determine the product of the density of scatters and the two-way transmission to the range of interest. The transmission is approximately unity, and even if it is not unity, it can be determined from the Raman scattering signal from nitrogen. Thus, the strength of the return at the appropriate wavelength can be used to determine the concentration of a given scatterer.

In view of the preceding discussion, it will now be seen that the basic principle of the present invention is that intense monochromatic illumination of a gaseous material results in some scattering of the incident illumination, predominantly at the wavelength or wavenumber of that illumination but also partly at characteristically different wavenumbers, the so-called Raman-shifted wavenumbers. The amount of a Raman-shift expressed in wave-numbers is characteristic of the molecular species of he illuminated gas and the particular molecular mode excited by the incident illumination. The presence and relative intensity of a particular Raman-shifted return can therefore signify the presence and amount of particular gaseous molecular species, and with the use of pulsed illumination the time of arrival of the Raman-shifted return signifies the range to the location of the scattering gas.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is potential energy diagram for a typical molecule undergoing vibrational Raman scattering;

FIG. 2 is a representative embodiment of the invention for remote analysis of an inaccessible gas flow; and FIG. 3 is a pictorial representation of the invention for monitoring gaseous pollutants.

In U.S. Pat. application Ser. No. 647,697, filed June 21, 1967, and assigned to the same assignee, there is shown and described apparatus for determining visual range. Such apparatus, by utilizing a sufficiently intense pulse of monochromatic light as from a nitrogen laser, obtains Raman-scattered returns from the atmospheric molecular species $N_2$ and $O_2$. Conventional optical collector means and very simple filter means are provided to separate the Raman scattered light from other light. Since $N_2$ and $O_2$ have moderate Raman-scattering cross sections of the order of $10^{-29}$cm.$^2$, $N_2$ and $O_2$ provide perceptible Raman-scattered returns given a proper combination of optical system and range.

The Raman shifts of light scattered from $N_2$ and $O_2$, expressed in wavenumbers, are respectively 2330.7 and 1554.7 cm.$^{-1}$. At an illuminating wavelength of 3371 A., which is 29665 cm.$^{-1}$, 13 shifts are fractionally about 1 part in 13 and 1 part in 19 of the wavenumber of the illumination. With such a large fractional shift, the Raman scattered return from $N_2$ or $O_2$ may be easily separated from the illumination by the simple use of an interference filter.

Thus, in the aforementioned apparatus for determining visual range, whereas the energy of backscattered incident light is dependent on the nature of the particles of the atmosphere (it being the nature of the atmosphere and not the constituents thereof which is being measured), the intensity of the Raman scattering is dependent only upon the nitrogen or oxygen content of the air which are essentially constant for all atmospheric conditions. Accordingly, in the aforementioned apparatus for determining visual range, the backscattered Raman energy received is dependent only upon range and the intensity of the transmitting beam, both of which are known, and the absorption due to particles in the air. Therefore, visability along a particular portion of a glide slope is determined by simply determining the ratio of the transmitted energy to the received Raman scattering.

In distinction from the above, a factor important to the present invention is that a high degree of wavenumber selectivity is attainable through the use of a prism or grating spectrometer system or by an interferometer. Thus, in a simple system which separates the D lines of sodium, the fractional selectivity is 1 part in 1000. At 3371 A., this is equivalent to a separation of 29.6 cm.$^{-1}$ in wavenumber, and many interesting gaseous species identified hereinbelow have Raman shifts which are separated by at least this amount from the shifts of other species from which one might wish to distinguish them. For example, the gas CO which occurs in gasoline engine exhausts has a Raman shift of 2145 cm.$^{-1}$, which is separated by 185.7 cm.$^{-1}$ from the Raman shift of $N_2$ at 2330.7 cm.$^{-1}$. Similarly, the strong $CO_2$ shifts at 1285.5 cm.$^{-1}$ and 1388.3 cm.$^{-1}$ are separated at least 166.4 cm.$^{-1}$ from the Raman shift of $O_2$ at 1554.7 cm.$^{-1}$. Table I shows the Raman shifts of several species.

Reference is now made to FIG. 2 which is a representative embodiment of the invention for remote analysis of an inaccessible gas flow. An example of such a flow would be highly radioactive gas flowing in a reactor system, where one might wish to sense the presence of $N_2$ or $O_2$ as indicators of a possibly dangerous leakage of air into the system. A pulsed laser 1, preferably of the nitrogen type with output at 3371 A., is driven by a repetitive pulse generator 2. For a more comprehensive discussion of the construction and operation of a suitable laser and/or pulse generator, reference is made to patent application Ser. No. 536,094 filed Mar. 21, 1966 and assigned to the same assignee. The transmitted pulses from the laser 1 are triggered by the conventional pulse generator 2 which serves to operate a variable range-gating delay generator 3. The trigger output from generator 2 to the laser transmitter 1 originates the transmission of a laser pulse and the trigger output from generator 2 to the range-gating delay generator 3 originates a time variable pulse which is applied to gating circuit means 6 more fully described hereinafter. The output pulse of range-gating delay generator 3 via the gating circuit 6 couples the output of light sensitive cells 5 to the output terminal 12 only at the instant when the scattered laser light has reached and produced output signals from the cells 5.

The beam from the laser transmitter 1 passes through a window 7 in the wall of conduit 8 (only a short section of which is shown) which carries the gas 9 to be analyzed. The window 7 is transparent to the laser pulse. The part of the incident laser beam which is not scattered by the gas 9 is largely absorbed by light absorbing means 10 carried by the wall of conduit 8 opposite window 7. The scattered light is returned in part to wavenumber selective means 4 which is to be understood to include collector optics of suitable size, and which is shown as being of the prism spectrometer type. The focal surface of the spectrometer is provided with light-sensitive cells 5 disposed in a position to intercept dispersed light at the wavenumber of the laser beam and at the Raman-shifted wavenumber of the light scattered by the species in the gas being analyzed.

In order better to distinguish the Raman scattered returns from other light, gating means 6 is provided in the output circuits of light-sensitive cells 5. The gating circuit 6 is actuated by the output signal of the adjustable range-gating delay generator 3 to couple the output signal from cells 5 to the output terminals 12 only at the instant when the scattered laser light has reached and actuated the appropriate cells 5.

The Raman-shifted scattered light received by wavenumber-selective means 4 is some orders of magnitude weaker than the scattered light at the illuminating wavenumber. This places stringent requirements upon the filtering or dispersing means used to separate the Raman-shifted scattered light in order to prevent spurious responses from leakage of light at the illuminating wavenumber. Simple grating-type spectrometers are particularly prone to have excessive leakage, for while they can easily provide excellent separation of equally intense components, they tend to spread each component over the entire spectrum as a low-level background due to diffuse reflection by the grating. For this reason, prism-type equipment is used and every precaution against leakage is taken as by use of adequate baffles and anitreflection coating of the optical elements. Of course, double-pass and multiple-pass arrangements are feasible as means for improving the response ratio between desired and undesired wavenumbers. For simplicity, however, a single-pass arrangement with a rejection-type interference filter added is preferred, as indicated by numeral 11. The provision of a rejection-type interference filter markedly reduces the intensity of the return at the wavenumber of the illumination without excessive attenuation of Raman-shifted returns a few hundred per centimeter away. Even with all of the foregoing precautions, some slight leakage at the wavenumber of the illumination will still occur. One light-sensitive cell 5a is therefore provided to measure the return at that wavenumber, and suitable fractions of the output of this cell subtracted from the output of each of the cells measuring the other returns. This may be done in any of a large number of conventional ways known to those skilled in the art of data processing.

Another embodiment of the invention is shown in FIG. 3 for monitoring atmospheric pollutants. A projector-receiver, designated by the number 13 and comprising a laser transmitter and receiver, is employed to project the monochromatic illuminating beam and to receive and separate into its components the returned scattered light. Projector-receiver 13 in FIG. 3 comprises all the elements indicated in the system of FIG. 2 by the numerals 1, 2, 3, 4, 5, 6, 11 and 12 together with collector optics of suitable aperture. The illuminating beam from projector-receiver 13 is pointed at the effluent gas 14 from a potential source 15 of atmospheric pollution. The pointing is performed by a conventional powered gimbal system 16 under the control of a conventional computer 17 and a display-control console 18. In general, there will be a number of known potential sources of pollution, and one principal function of computer 17 is to point projector-receiver 13 at these sources sequentially, adjusting its range-gating delay generator 3 to the appropriate range of each source. New sources of pollution can be detected and their direction and range entered in the computer memory for later examinations by interleaving a search mode with the sequential examination mode in the computer command structure. Also, command of the system may be exercised by an operator at display-control console 18. Data on the presence, location, kind and amount of atmospheric pollutants are presented at display-control console 18 for appropriate recording, warning or action.

The invention may also be used to sense and locate military targets emitting characteristic gases, such as, for example, enemy mortars or artillery. As in the previous case, a combined projector-receiver 13 may be used and is carried and pointed by a powered gimbal system 16 under the control of a computer 17 and display-control console 18. In this case, the normal operating mode is that of search, the projector-receiver 13 being pointed sequentially over azimuths of interest, which may be all azimuths in counterinsurgency operations. Also, all ranges are searched in the manner previously described. The wavenumber assignments of the light-sensitive cells 5 in the projector-receiver 13 (see FIG. 1) are made to match the Raman shifts of gases characteristic of propellants used by mortars, rockets, artillery and the like. Such gases are principally carbon monoxide and the nitrogen oxides. Weighting factors are applied to the output signals from the cells and are set to maximize response to the expected propellant gases.

When a return is obtained from a target mass of propellant gas, the location data is processed and stored immediately by the computer 17, presented on display console 18 for evaluation, and transmitted over a data channel (not shown) together with evaluation data for appropriate action. The steady search mode of the computer 17 can then be interleaved with repetitive examinations of the general location of the target and of other targets which may appear, so as to minimize the time to detect subsequent gaseous emissions from those target locations. This invention is also capable of sensing the presence, composition and location of other militarily significant gases such as antipersonnel gases. For such use, it is only necessary that additional or substitute wavenumber assignments for the light-sensitive cells be made, with suitable weighting factors applied to the output signals.

The invention may be further used to sense and locate from an aircraft characteristic gases emitted by military targets, such as motorized ground vehicles. The detailed logic of this system is only slightly different, while the general approach remains the same. Thus, in this case, the projector-receiver 13 and its powered gimbal system may be carried in a downward-looking streamlined optical dome on the underside of aircraft. The associated control computer and display-control equipment scan the projector-receiver over paths and roads which might carry motorized vehicles. The adjustable range-gating delay generator is automatically set to just above ground level by using the strong returns from the ground-reflected pulsed illuminating beam. If there are one or more motorized vehicles in the beam, their exhaust gases will provide a target to be sensed by their Raman-shifted scattered return. In this case, the wavenumber assignments, of the light-sensitive cells 5, in projector-receiver 13, are made to match the Raman shifts of the major components of such exhaust gases, principally carbon monoxide and carbon dioxide. Since carbon dioxide occurs as a normal atmospheric constituent and as a product of respiration, the excess thereof, due to exhaust gases, is indicative of the presence of motorized vehicles.

The foregoing embodiments of the invention have been shown and described in terms of a particular set of means. It will be obvious to those skilled in the arts of electronics and optics that many substitutions may be made without departing from the spirit and scope of the invention. For example, interferometer or interference filter means can be substituted for the prism spectrometer shown as a means for separating the Raman-shifted scattered light returns from each other and from the scattered incident light. Also, one could use one or more movable light-sensitive cells to scan the focal surface of the spectrometer instead of using fixed cells as shown. Or an interference filter used as the means for separating the Raman-shifted scattered light returns can be tilted repetitively so as to scan its wavenumber of maximum response. Also, it is not necessary to use computer means for commanding the aiming of a projector-receiver and a powered gimbal system to do the actual aiming; these functions can be performed by a human operator if a simplified system is desired. Other substitutions of means are equally evident.

It is realized that detection and ranging of objects by reflected light pulses is well known in the art, and that identification of substances by their effect upon incident light beams is also an old principle. Therefore, these principles are not claimed broadly. However, what is claimed is:

1. In a gaseous detection system, the combination comprising:
   a. transmitter means for projecting a pulsed beam of incident monochromatic light, the light energy in said beam being sufficient that upon said beam passing through gaseous material said light energy is detectably scattered partly at the same wavenumber as that of the incident light and partly at wavenumbers differing from that of the incident light by the Raman shift of molecular species of the gaseous material;
   b. receiver means at essentially the same location as said transmitter means, said receiver means including (1) optical collector means for receiving said scattered light, and (2) light filter means for receiving light from said optical collector means, said light filter means separating light received from said collector means into a first light beam having (1) energy predominantly at a wavenumber equal to that of the incident light and to a lesser extent energy at a wavenumber equal to that of incident shifted light, and (2) at least a second light beam having energy predominantly at a wavenumber equal to that of a Raman-shifted light beam and to a lesser extent energy a wavenumber equal to that of the incident light;
   c. light sensitive means for receiving said first and second light beams and providing first and second electrical output signals respectively proportional to said first and second light beams; and
   d. means for receiving said first and second output signals, said means subtracting a portion of said first signal from said second signal to produce a third output signal wherein the portion of said second signal resulting from said energy at a wavenumber equal to that of said incident light is substantially cancelled.

2. The combination as defined in claim 1 and additionally including range-gating means coupled to the output of said light sensitive means, said range-gating means passing said output signals resulting from said Raman-shifted light beam originating at a selectable distance from said receiver.

3. The combination as defined in claim 2 wherein said transmitter means is a pulsed nitrogen laser for providing light pulses at a wavelength of 3371 A. and additionally including:
   a. gimbal means for simultaneously selectable pointing said transmitter and receiver means; and
   b. indicator means for receiving said third output for indicating the location of a gaseous material producing said Raman-shifted light in said second light beam.

4. The combination as defined in claim 3 and additionally including computer means for selectably controlling said gimbal means and said range-gating means.

* * * * *

UNITED STATES PATENT OFFICE
CERTIFICATE OF CORRECTION

Patent No. 3,625,613            Dated    December 7, 1971

Inventor(s) Gurdon R. Abell and Charles E. Gillespie

It is certified that error appears in the above-identified patent and that said Letters Patent are hereby corrected as shown below:

In the ABSTRACT, line 1, for "A turbomachine" read ---The---; Column 2, line 72, for "$(6940/3371)^{Cl}$" read ---$(6940/3371)^4$---; Column 3, line 14, for "$N_{scat}$" read ---$N_{SCAT}$---; Column 3, line 16, delete "=" (first occurrence); Column 3, line 18, for "$N_{scatt}$" read ---$N_{SCAT}$---; Column 3, line 32, for "been" read ---be---; Column 3, line 34, for "scatters" read ---scatterers---; Column 3, line 48, for "he" read ---the---; Column 4, line 8, for "13" (first occurrence) read ---these---; Column 7, line 24, for "incident" read ---Raman---; and Column 7, line 27, after "energy" read ---at---.

Signed and sealed this 6th day of February 1973.

(SEAL)
Attest:

EDWARD M. FLETCHER, JR.
Attesting Officer

ROBERT GOTTSCHALK
Commissioner of Patents